US009092098B2

(12) United States Patent
Konovalov et al.

(10) Patent No.: US 9,092,098 B2
(45) Date of Patent: Jul. 28, 2015

(54) METHOD AND APPARATUS TO IMPROVE NOISE IMMUNITY OF A TOUCH SENSE ARRAY

(75) Inventors: Anton Konovalov, Khmelnitsky (UA); Andriy Yarosh, Moguliv-Podilskiy (UA); Andriy Maharyta, Lviv (UA); Roman Ogirko, Lviv (UA); Oleksandr Pirogov, Lviv (UA); Roman Sharamaga, Lviv (UA); Viktor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 367 days.

(21) Appl. No.: 13/246,565

(22) Filed: Sep. 27, 2011

(65) Prior Publication Data

US 2012/0268415 A1   Oct. 25, 2012

Related U.S. Application Data

(60) Provisional application No. 61/477,146, filed on Apr. 19, 2011.

(51) Int. Cl.
G06F 3/045 (2006.01)
G06F 3/044 (2006.01)
G06F 3/041 (2006.01)

(52) U.S. Cl.
CPC ............. *G06F 3/044* (2013.01); *G06F 3/0418* (2013.01)

(58) Field of Classification Search
None
See application file for complete search history.

(56) References Cited

U.S. PATENT DOCUMENTS

| 5,053,757 | A | 10/1991 | Meadows |
| 6,734,843 | B2 | 5/2004 | Bertram et al. |
| 7,451,050 | B2 | 11/2008 | Hargreaves |
| 7,643,011 | B2 | 1/2010 | Westerman |
| 7,986,193 | B2 | 7/2011 | Krah |
| 2006/0267953 | A1 | 11/2006 | Peterson et al. |
| 2008/0157882 | A1 | 7/2008 | Krah |
| 2008/0157893 | A1* | 7/2008 | Krah ..................... 331/177 R |
| 2008/0158169 | A1* | 7/2008 | O'Connor et al. ......... 345/173 |
| 2009/0153152 | A1 | 6/2009 | Maharyta et al. |
| 2009/0315851 | A1 | 12/2009 | Hotelling et al. |
| 2010/0139991 | A1 | 6/2010 | Philipp et al. |
| 2011/0007028 | A1 | 1/2011 | Curtis et al. |

FOREIGN PATENT DOCUMENTS

JP   8076924   3/1996

OTHER PUBLICATIONS

International Search Report for International Application No. PCT/US11/66685 dated May 4, 2012; 2 pages.
Written Opinion of the International Searching Authority for International Application No. PCT/US11/66685 dated May 4, 2012; 7 pages.
Han,Chang Hoon, "Adaptive Ultrasonic Distance Measurement Technique for Handwriting Digitization Using Reconfigurable Analog Blocks," IEEE Transactions on Instrumentation and Measurement, vol. 59, No. 8, Aug. 2010, pp. 2240-2242; 3 pages.
Jabra GO-6470 User Manual; 40 pages.

* cited by examiner

*Primary Examiner* — Nicholas Lee

(57) ABSTRACT

A method for improving noise immunity of capacitive sensing circuit associated with a touch sense array is disclosed. The capacitive sensing circuit receives a response signal from a touch sense array. The capacitive sensing circuit measures a noise component of the response signal. When a level of noise of the noise component within a passband of the capacitive sensing circuit is greater than a threshold, the capacitive sensing circuit changes at least one parameter of capacitive sensing circuit to move the passband substantially outside the frequency spectrum of the noise component.

17 Claims, 26 Drawing Sheets

— Noise signal Spectrim

Dependence of Rawcounts Noise Level on Noise Amplitude and Frequency. classical Solo Channel (Foperation = 235 KHz)

Dependence of Rawcounts Noise Level on Noise Amplitude and Frequency. Force Synchronized Channel (Foperation = 230 KHz)

Comparison between two types of frequency manipulation techniques, Vnoise-1 Vpp

— Classic channel 235KHz
— Force synchronized channel 230KHz

Comparison between two types of frequency manipulation techniques, Vnoise-2 Vpp

— Classic channel 235KHz
— Force synchronized channel 230KHz

Comparison between two types of frequency manipulation techniques, Vnoise-6 Vpp

1800

METHOD AND APPARATUS TO IMPROVE NOISE IMMUNITY OF A TOUCH SENSE ARRAY

RELATED APPLICATIONS

This application claims the benefit of Provisional Application No. 61/477,146, filed on Apr. 19, 2011, the entire contents of which are hereby incorporated by reference.

TECHNICAL FIELD

This disclosure relates to the field of user interface devices and, in particular, to capacitive sense devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touchscreens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

Electronic systems that include touch screens are sensitive to a variety of noise sources. Noise coupled into touch screens and circuitry for applying and measuring the presence of a touch on a touch screen (hereinafter "touch controllers") may result in significantly reduced accuracy, resulting in false touches and the reported location of a touch on a touch screen. FIG. 1 depicts various paths that induced noise currents may take between a source of noise, a user of a touch screen, and the touch screen and touch controller. The main sources of induced noise include (1) switching regulators employed in DC-AC, DC-DC, and AC-DC converters used in power supplies and battery chargers for touch controllers and nearby external electronic equipment; (2) electromagnetic noise emitted by external electronic equipment, for example, by high speed motors during operation of the external equipment (i.e., in vacuum cleaners, mixers, washing machines, etc); (3) noise emitted by radio transmitting equipment (e.g., radio stations, mobile communications, CB radios, etc); and (4) noise emitted by high-voltage power lines.

These noise sources may emit electromagnetic radiation over a narrow band of frequency, a wideband of frequencies, or both under different operating conditions. Of the noise sources listed above, chargers and power supplies for use with touch screens are the most common and cause the largest number of false or inaccurate touch events reported by touch controllers. FIGS. 2A-2C, for example, depict amplitude vs. time and frequency for common mode noise emitted by a battery charger under different load conditions. The number of harmonics, the fundamental frequency, and amplitude of common mode charger noise depend on charger type, charger electronics, and charger physical construction. As shown in FIGS. 2A-2C, harmonic frequencies change during the battery charge process, resulting in a frequency band of noise that changes with time but generally has a narrow bandwidth.

Radiated noise may be coupled into conductors of the touch screen and/or touch controller radio transmitting equipment. The coupled radiated noise signal waveform type depends on the environment. The waveforms may be simple sine waves or waveforms with several tens of harmonics.

Noise sources generated internally within touch controllers may include internal charge pumps, communication lines, LCDs, etc.

A touch controller's response to injected noise depends to a large degree on the frequency response characteristic of a touch screen measurement channel within the touch controller. The measurement channel frequency response of a conventional touch controller is shown in FIG. 3. The frequency response characteristic shown in FIG. 3 contains high sensitivity zones (200-250 KHz, 700-750 Khz) and low sensitivity zones to noise. If a harmonic of injected noise coincides with one or more of the high sensitivity zones, the touch controller accuracy may be significantly reduced, resulting in false touches, etc. This is demonstrated in FIG. 4, which illustrates the effects of noise having harmonic components that coincide with a measurement channel response characteristic. FIG. 4 shows the effect of harmonically-induced noise on raw counts of a simulated finger touch over time as the amplitude of the harmonically induced noise increases.

BRIEF DESCRIPTION OF THE DRAWINGS

The present invention is illustrated by way of example, and not of limitation, in the figures of the accompanying drawings in which.

DETAILED DESCRIPTION

Figure 1:
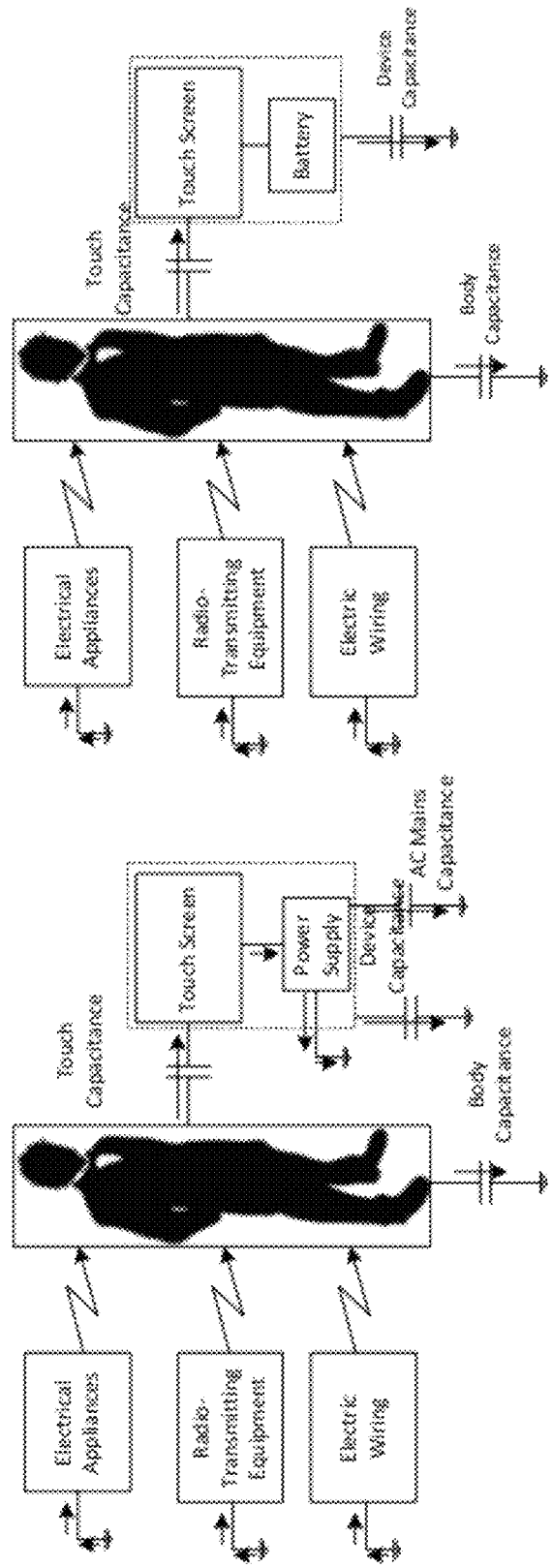
FIG. 1 depicts various paths that induced noise currents may take between a source of noise, a user of a touch screen, and the touch screen and touch controller.
Figure 2A:
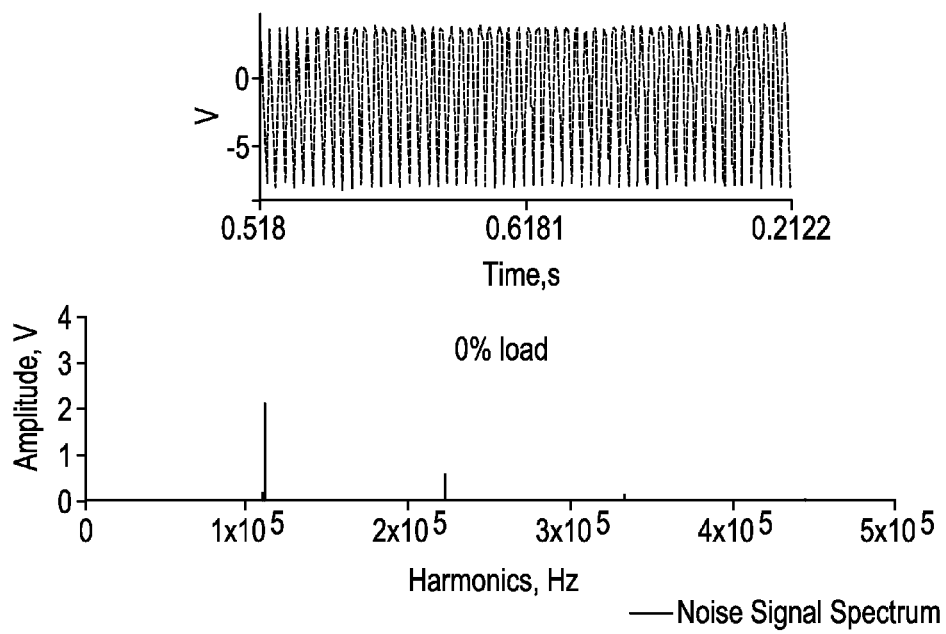
FIGS. 2A-2C depict amplitude vs. time and frequency for common mode noise emitted by a battery charger under different load conditions.
Figure 2B:
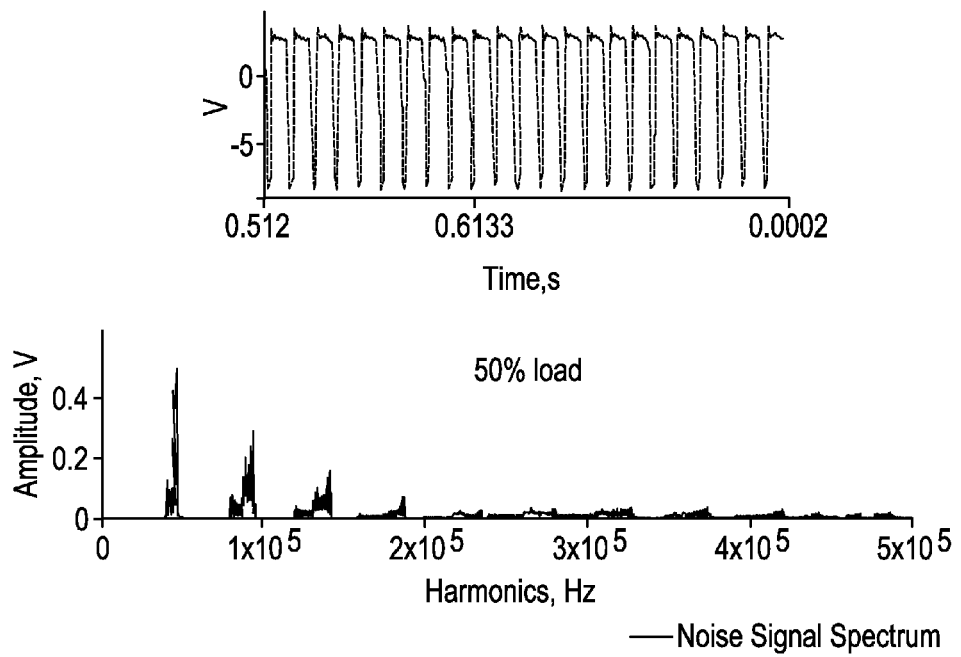
Figure 2C:
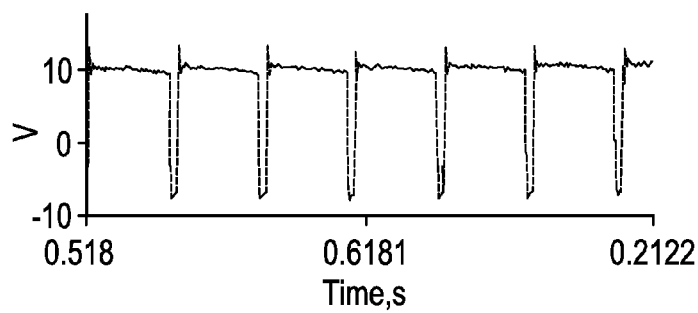
Figure 2C:
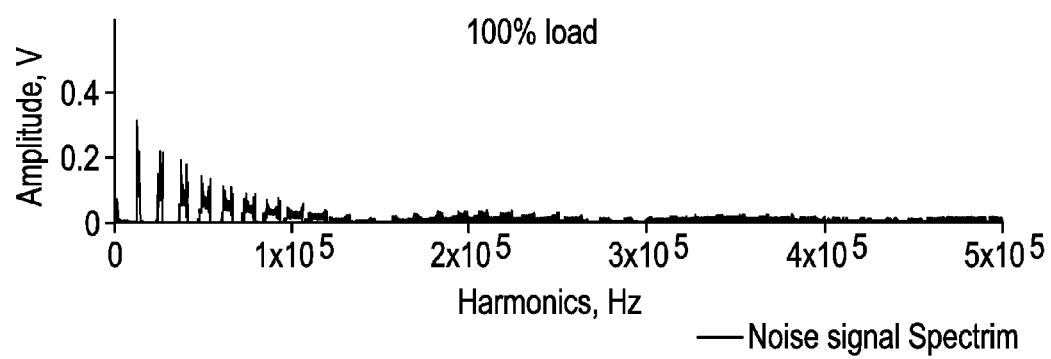

A method for improving noise immunity of capacitive sensing circuit associated with a touch sense array is described. In one embodiment, the capacitive sensing circuit receives a response signal from a touch sense array. The capacitive sensing circuit measures a noise component of the response signal. The noise component may have a frequency spectrum within a passband corresponding to the operating frequency of the capacitive sensing circuit. When a level of noise of the noise component within the passband is greater than a threshold, the capacitive sensing circuit changes at least one parameter of capacitive sensing circuit to move the passband substantially outside the frequency spectrum of the noise component. As used herein, the term "threshold" refers to, but is not limited to, an absolute (fixed) level of noise, a relative level of noise, a computed level of noise, a changing level of noise, or a signal-to-noise ratio. Alternatively, other thresholds may be used as would be appreciated by one of ordinary skill in the art having the benefit of this disclosure.

In one embodiment, changing a sensing frequency passband involves forcing synchronization of the sensing frequency passband of the capacitive sensing circuit to cause the frequency spectrum of the noise component to substantially match the passband of the capacitive sensing circuit.

In an embodiment, determining whether the level of noise is above the threshold is effected by the capacitive sensing circuit listening to the level of noise by measuring the level of noise in a mutual capacitance mode when all receive (RX) electrodes are tied together in a single channel and a transmit (TX) signal absent on TX electrodes. Listening may be incorporated into a data stream resulting from a touch sense array scanning process by having the capacitive sensing circuit alternating between listening to the level of noise and performing a full panel scan of the touch sense array. In another embodiment, the capacitive sensing circuit interleaves listening to the level of noise and performing a partial scan of the touch sense array.

In an embodiment, measuring a noise component of the response signal and changing the sensing frequency passband involves the capacitive sensing circuit listening to the level of noise interleaved with performing a panel scan of the touch sense array and measuring the level of noise. If the level of noise is above a threshold, the capacitive sensing circuit is switched to a next available sensing frequency passband. The above process is repeated until all available sensing frequency passbands are exhausted. An available sensing frequency passband having the lowest level of noise is selected for further scans.

The above method is most effective for reducing the influence of a narrowband induced noise, such as, for example, noise emitted by different chargers or electroluminescent ballast circuits. By shifting a measurement channel passband, noise influence on touch measurements is significantly reduced by rendering the capacitive sensing circuit relatively immune to noise-induced false touches and to the presence of water. In addition, conclusions drawn concerning the presence of noise may be made before touch position reporting.

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Figure 5:
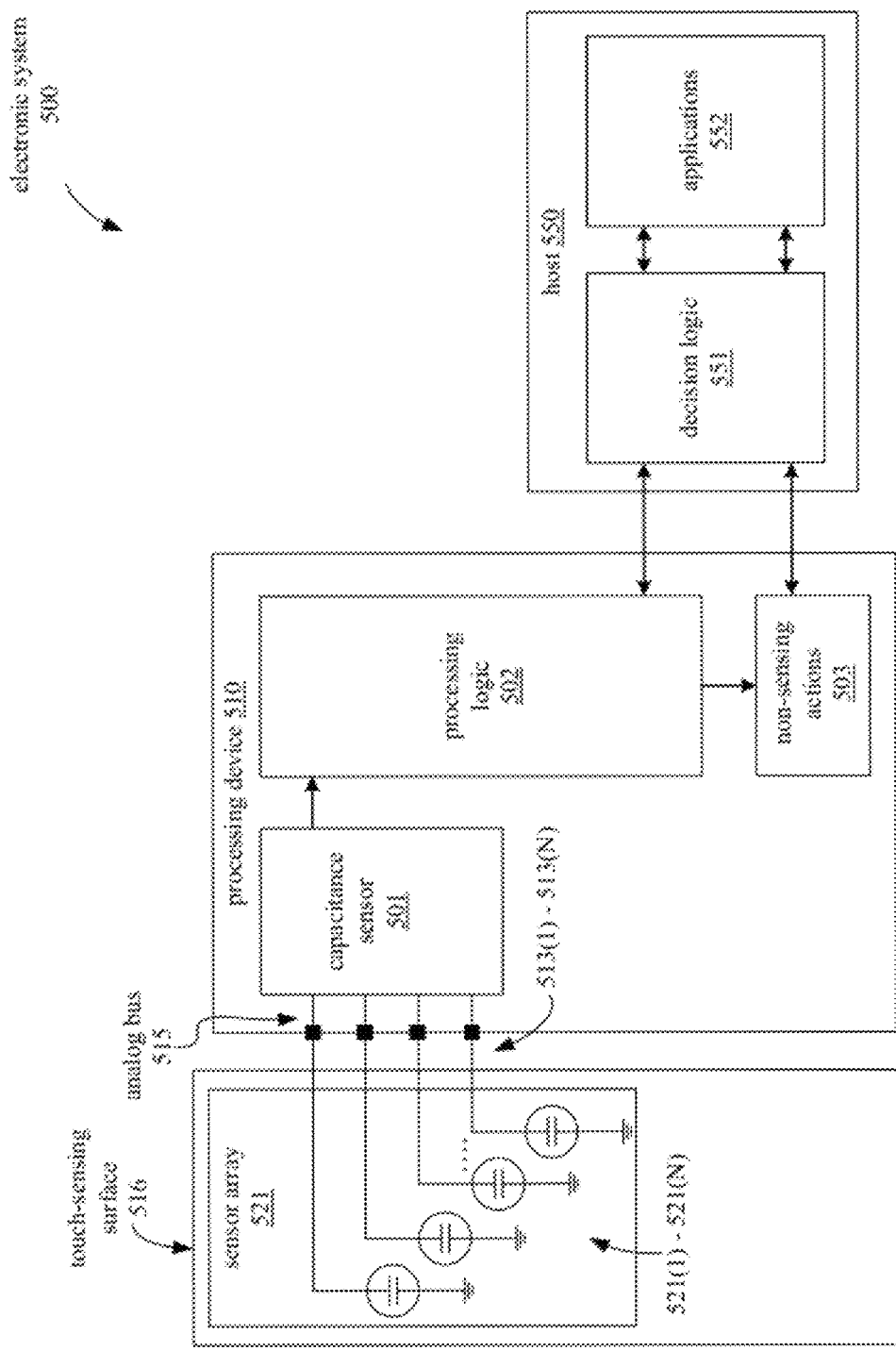
FIG. 5 illustrates a block diagram of one embodiment of an electronic system including a processing device that may be configured to measure capacitances from a flexible touch-sensing surface and calculate or detect the amount of force applied to the flexible touch-sensing surface.

FIG. 5 illustrates a block diagram of one embodiment of an electronic system 500 including a processing device 510 that may be configured to measure capacitances from a flexible touch-sensing surface and calculate or detect the amount of force applied to the flexible touch-sensing surface. The electronic system 500 includes a touch-sensing surface 516 (e.g., a touchscreen, or a touch pad) coupled to the processing device 510 and a host 550. In one embodiment, the touch-sensing surface 516 is a two-dimensional user interface that uses a sensor array 521 to detect touches on the surface 516.

In one embodiment, the sensor array 521 includes sensor elements 521(1)-521(N) (where N is a positive integer) that are disposed as a two-dimensional matrix (also referred to as an XY matrix). The sensor array 521 is coupled to pins 513(1)-513(N) of the processing device 510 via one or more analog buses 515 transporting multiple signals. In this embodiment, each sensor element 521(1)-521(N) is represented as a capacitor. The self capacitance of each sensor in the sensor array 521 is measured by a capacitance sensor 501 in the processing device 510.

In one embodiment, the capacitance sensor 501 may include a relaxation oscillator or other means to convert a capacitance into a measured value. The capacitance sensor 501 may also include a counter or timer to measure the oscillator output. The capacitance sensor 501 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 501 may be evaluating other measurements to determine the user interaction. For example, in the capacitance sensor 501 having a sigma-delta modulator, the capacitance sensor 501 is evaluating the ratio of pulse widths of the output, instead of the raw counts being over or under a certain threshold.

In one embodiment, the processing device 510 further includes processing logic 502. Operations of the processing logic 502 may be implemented in firmware; alternatively, it may be implemented in hardware or software. The processing logic 502 may receive signals from the capacitance sensor 501, and determine the state of the sensor array 521, such as whether an object (e.g., a finger) is detected on or in proximity to the sensor array 521 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 502 in the processing device 510, the processing device 510 may send the raw data or partially-processed data to the host 550. The host 550, as illustrated in FIG. 5, may include decision logic 551 that performs some or all of the operations of the processing logic 502. Operations of the decision logic 551 may be implemented in firmware, hardware, software, or a combination thereof. The host 550 may include a high-level Application Programming Interface (API) in applications 552 that perform routines on the received data, such as compensating for sensitivity differences, other compensation algorithms, baseline update routines, start-up and/or initialization routines, interpolation operations, or scaling operations. The operations described with respect to the processing logic 502 may be implemented in the decision logic 551, the applications 552, or in other hardware, software, and/or firmware external to the processing device 510. In some other embodiments, the processing device 510 is the host 550.

In another embodiment, the processing device 510 may also include a non-sensing actions block 503. This block 503 may be used to process and/or receive/transmit data to and from the host 550. For example, additional components may be implemented to operate with the processing device 510 along with the sensor array 521 (e.g., keyboard, keypad, mouse, trackball, LEDs, displays, or other peripheral devices).

The processing device 510 may reside on a common carrier substrate such as, for example, an integrated circuit (IC) die substrate, or a multi-chip module substrate. Alternatively, the components of the processing device 510 may be one or more separate integrated circuits and/or discrete components. In one embodiment, the processing device 510 may be the Programmable System on a Chip (PSoC®) processing device, developed by Cypress Semiconductor Corporation, San Jose, Calif. Alternatively, the processing device 510 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or other programmable device. In an alternative embodiment, for example, the processing device 510 may be a network processor having multiple processors including a core unit and multiple micro-engines. Additionally, the processing device 510 may include any combination of general-purpose processing device(s) and special-purpose processing device(s).

In one embodiment, the electronic system 500 is implemented in a device that includes the touch-sensing surface 516 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 500 may be used in other types of devices. It should be noted that the components of electronic system 500 may include all the components described above. Alternatively, electronic system 500 may include only some of the components described above, or include additional components not listed herein.

Figure 6:
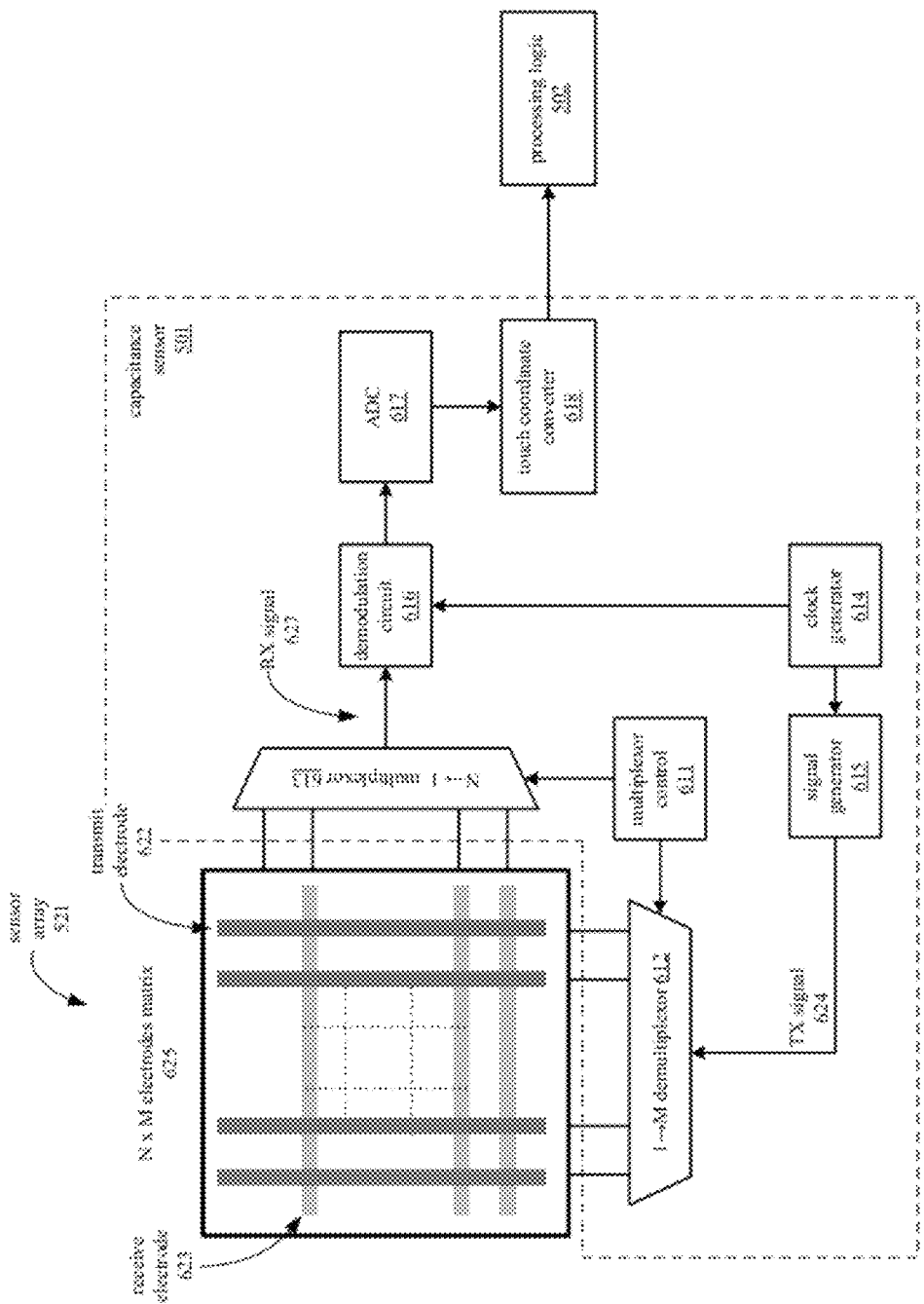
FIG. 6 is a block diagram illustrating one embodiment of a capacitive touch sensor array and a capacitance sensor that converts measured capacitances to coordinates.

FIG. 6 is a block diagram illustrating one embodiment of a capacitive touch sensor array 521 and a capacitance sensor 501 that converts measured capacitances to coordinates. The coordinates are calculated based on measured capacitances. In one embodiment, sensor array 521 and capacitance sensor 501 are implemented in a system such as electronic system 500. Sensor array 521 includes a matrix 625 of N×M electrodes (N receive electrodes and M transmit electrodes), which further includes transmit (TX) electrode 622 and receive (RX) electrode 623. Each of the electrodes in matrix 625 is connected with capacitance sensor 501 through demultiplexer 612 and multiplexer 613.

Capacitance sensor 501 includes multiplexer control 611, demultiplexer 612 and multiplexer 613, clock generator 614, signal generator 615, demodulation circuit 616, and analog to digital converter (ADC) 617. ADC 617 is further coupled with touch coordinate converter 618. Touch coordinate converter 618 outputs a signal to the processing logic 502.

The transmit and receive electrodes in the electrode matrix 625 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 622 is capacitively coupled with receive electrode 623 at the point where transmit electrode 622 and receive electrode 623 overlap.

Clock generator 614 supplies a clock signal to signal generator 615, which produces a TX signal 624 to be supplied to the transmit electrodes of touch sensor 521. In one embodiment, the signal generator 615 includes a set of switches that operate according to the clock signal from clock generator 614. The switches may generate a TX signal 624 by periodically connecting the output of signal generator 615 to a first voltage and then to a second voltage, wherein said first and second voltages are different.

The output of signal generator 615 is connected with demultiplexer 612, which allows the TX signal 624 to be applied to any of the M transmit electrodes of touch sensor 521. In one embodiment, multiplexer control 611 controls demultiplexer 612 so that the TX signal 624 is applied to each transmit electrode 622 in a controlled sequence. Demultiplexer 612 may also be used to ground, float, or connect an alternate signal to the other transmit electrodes to which the TX signal 624 is not currently being applied.

Because of the capacitive coupling between the transmit and receive electrodes, the TX signal 624 applied to each transmit electrode induces a current within each of the receive electrodes. For instance, when the TX signal 624 is applied to transmit electrode 622 through demultiplexer 612, the TX signal 624 induces an RX signal 627 on the receive electrodes in matrix 625. The RX signal 627 on each of the receive electrodes can then be measured in sequence by using multiplexer 613 to connect each of the N receive electrodes to demodulation circuit 616 in sequence.

The mutual capacitance associated with each intersection between a TX electrode and an RX electrode can be sensed by selecting every available combination of TX electrode and an RX electrode using demultiplexer 612 and multiplexer 613. To improve performance, multiplexer 613 may also be segmented to allow more than one of the receive electrodes in matrix 625 to be routed to additional demodulation circuits 616. In an optimized configuration, wherein there is a 1-to-1 correspondence of instances of demodulation circuit 616 with receive electrodes, multiplexer 613 may not be present in the system.

When an object, such as a finger, approaches the electrode matrix 625, the object causes a decrease in the mutual capacitance between only some of the electrodes. For example, if a finger is placed near the intersection of transmit electrode 622 and receive electrode 623, the presence of the finger will decrease the mutual capacitance between electrodes 622 and 623. Thus, the location of the finger on the touchpad can be determined by identifying the one or more receive electrodes having a decreased mutual capacitance in addition to identifying the transmit electrode to which the TX signal 624 was applied at the time the decreased mutual capacitance was measured on the one or more receive electrodes.

By determining the mutual capacitances associated with each intersection of electrodes in the matrix 625, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 627 is rectified by demodulation circuit 616. The rectified current output by demodulation circuit 616 can then be filtered and converted to a digital code by ADC 617.

The digital code is converted to touch coordinates indicating a position of an input on touch sensor array 521 by touch coordinate converter 618. The touch coordinates are transmitted as an input signal to the processing logic 502. In one embodiment, the input signal is received at an input to the processing logic 502. In one embodiment, the input may be configured to receive capacitance measurements indicating a plurality of row coordinates and a plurality of column coordinates. Alternatively, the input may be configured to receive row coordinates and column coordinates.

In one embodiment, a system for tracking locations of contacts on a touch-sensing surface may determine a force magnitude for each of the contacts based on the capacitance measurements from the capacitive sensor array. In one embodiment, a capacitive touch-sensing system that is also capable of determining a magnitude of force applied to each of a plurality of contacts at a touch-sensing surface may be constructed from flexible materials, such as PMMA, and may have no shield between the capacitive sensor array and an LCD display panel. In such an embodiment, changes in capacitances of sensor elements may be caused by the displacement of the sensor elements closer to a VCOM plane of the LCD display panel.

Figure 3:
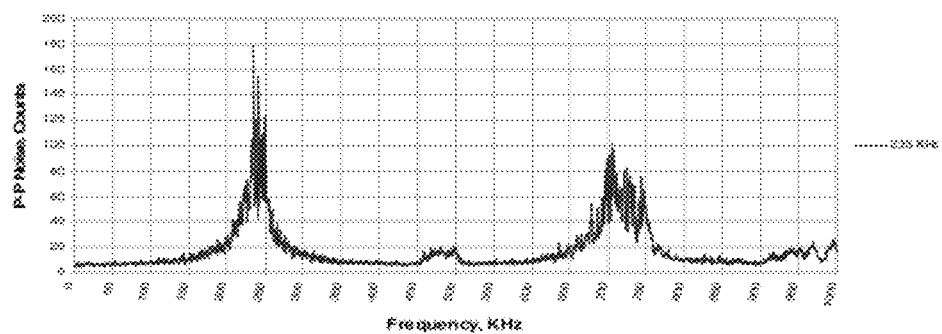
FIG. 3 shows a measurement channel frequency response of a conventional touch controller.
Figure 4:
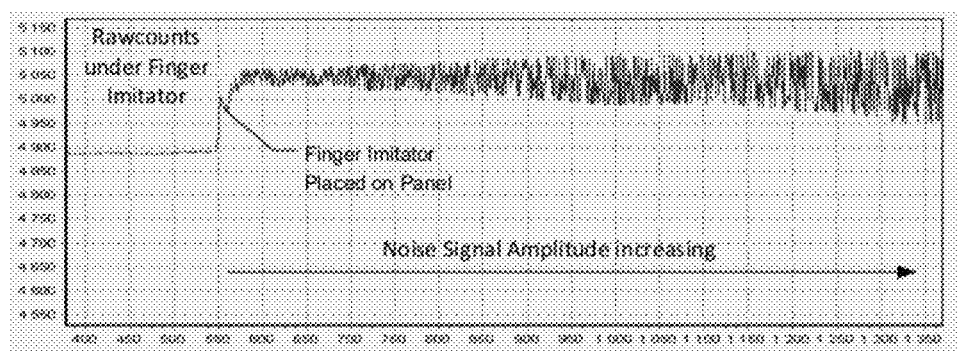
FIG. 4 illustrates the effects of noise having harmonic components that coincide with a measurement channel response characteristic.
Figure 7:
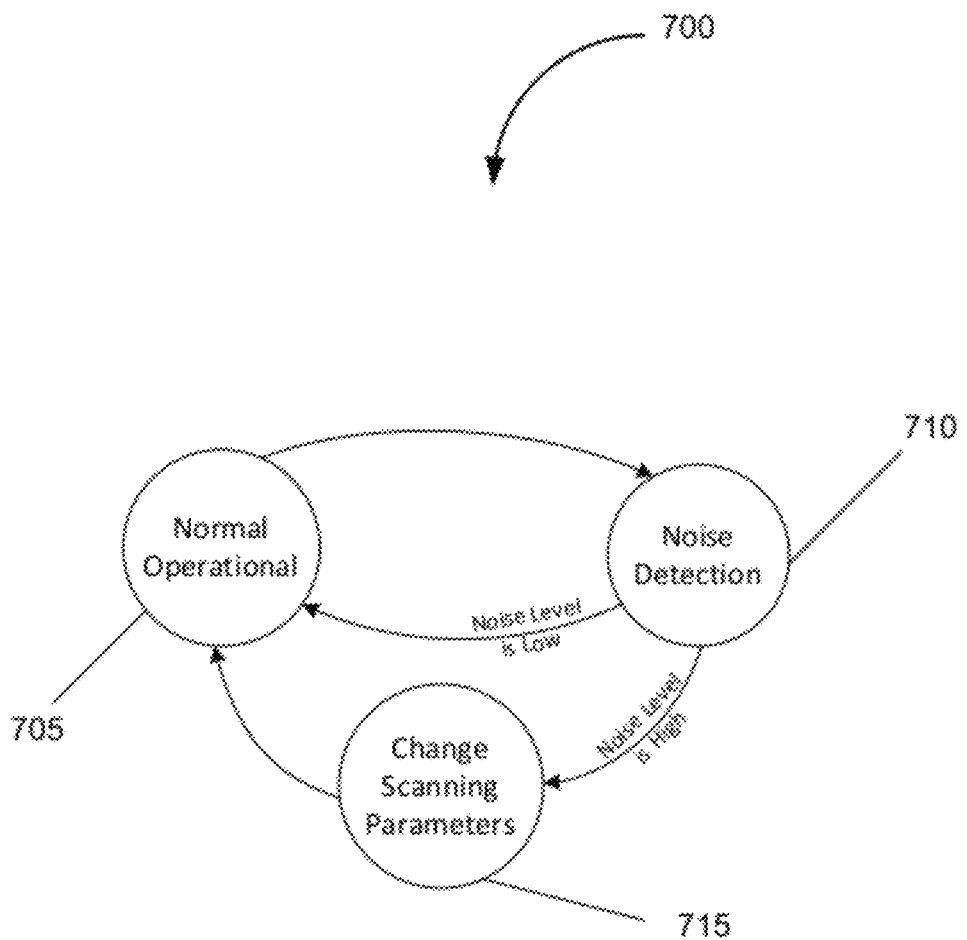
FIG. 7 is a state diagram of one embodiment of an adaptive frequency selection method that may be employed in the system of FIGS. 5 and 6 to render a capacitive sensor relatively immune to injected noise by shifting the pass band of the conversion channel of the capacitance sensor outside the induced noise spectrum.

It should be noted that a measurement channel, particularly the combination of the demodulation circuit 616, the clock generator 614, and the signal generator 615 of the capacitance sensor 501 and the processing logic 502 of FIG. 6 may be configured and operated to be relatively immune to injected noise if noise harmonics coincide with the low sensitivity zones depicted in FIG. 3. FIG. 7 is a state diagram 700 of one embodiment of an adaptive frequency selection method that may be employed in the system 500 of FIGS. 5 and 6 to render the capacitive sensor 501 relatively immune to injected noise by shifting the passband of the conversion channel of the capacitance sensor 501 outside the induced noise spectrum.

The capacitive sensor 501 is initially in a normal operation state 705. The capacitive sensor 501 transitions to a noise detection state 710 to measure a noise component of a response signal of the measurement channel. When a level of noise of the noise component is below a threshold, the capacitive sensor 501 transitions back to the normal operation state 705, and the process repeats. If, in state 710, the level of noise of the noise component exceeds the threshold, then the capacitive sensor 501 transitions to a state 715, where at least one scanning parameter of the capacitive sensor 501 is changed to move the passband of the measurement channel substantially outside the frequency spectrum of the noise component. Scanning parameters may include, but are not limited to, sensing frequency, integration time, driving signal, a number of sub-conversions per conversion cycle, and a number of transmit (TX) cycles in an individual sub-conversion. As used herein, a sub-conversion refers to a short conversion which is used to measure one cell of a signal during several measurements. As used herein, a cell refers to a cross section of transmit and receive electrodes on a capacitive sensing surface. The final result is formed by employing a mathematical transformation on the set of several measurements of the cell (i.e. averaging).

Figure 8:
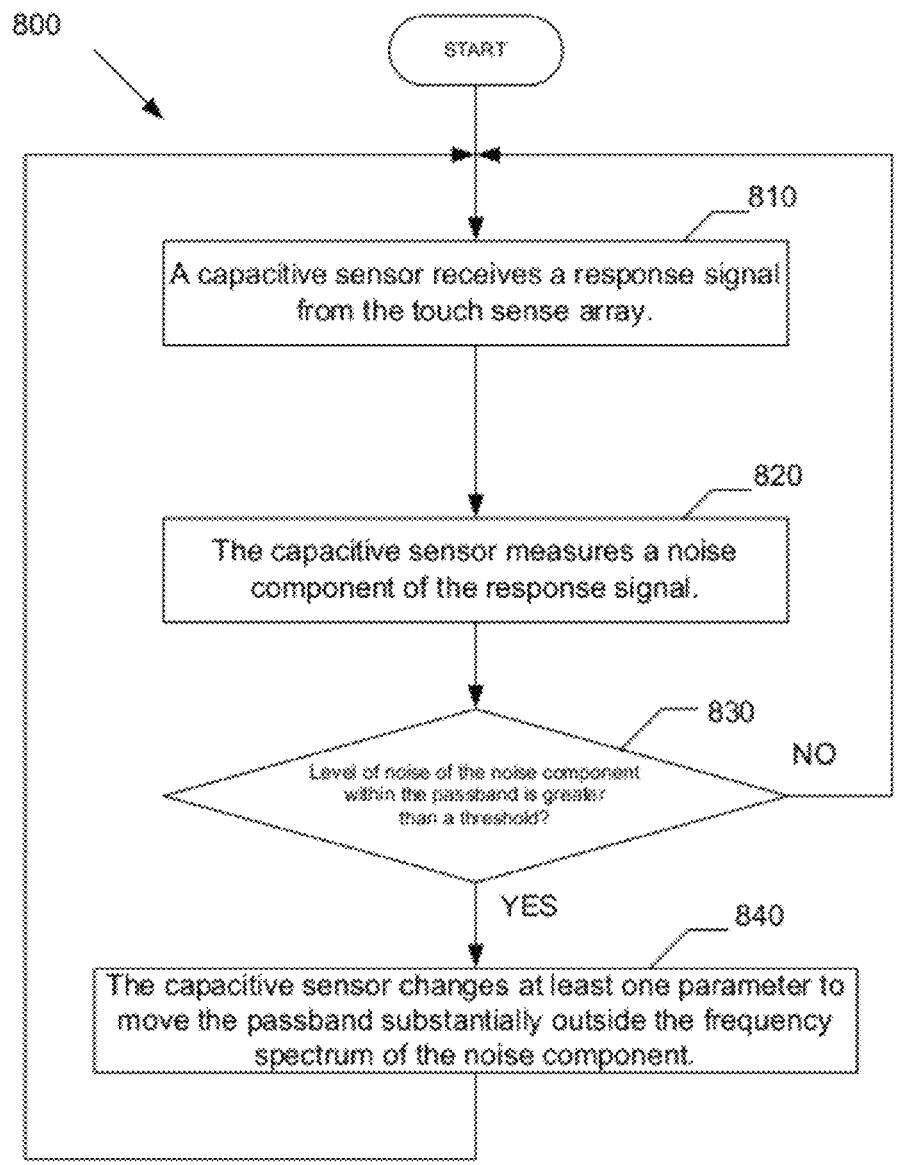
FIG. 8 is a process flow diagram corresponding to the state diagram of FIG. 7.

FIG. 8 is a process flow diagram 800 corresponding to the state diagram of FIG. 7. Referring now to FIGS. 5, 6, and 8, at block 810, the capacitive sensor 501 receives a response signal from the touch sense array 521. At block 820, the capacitive sensor 501 measures a noise component of the response signal. It should be noted that the noise component may have a frequency spectrum within a passband corresponding to the operating frequency of the capacitive sensor 501. At block 830, when a level of noise of the noise component within the passband is greater than a threshold, then at block 840, the capacitive sensor 501 changes at least one parameter of capacitive sensor 501 to move the passband substantially outside the frequency spectrum of the noise component.

Figure 9:
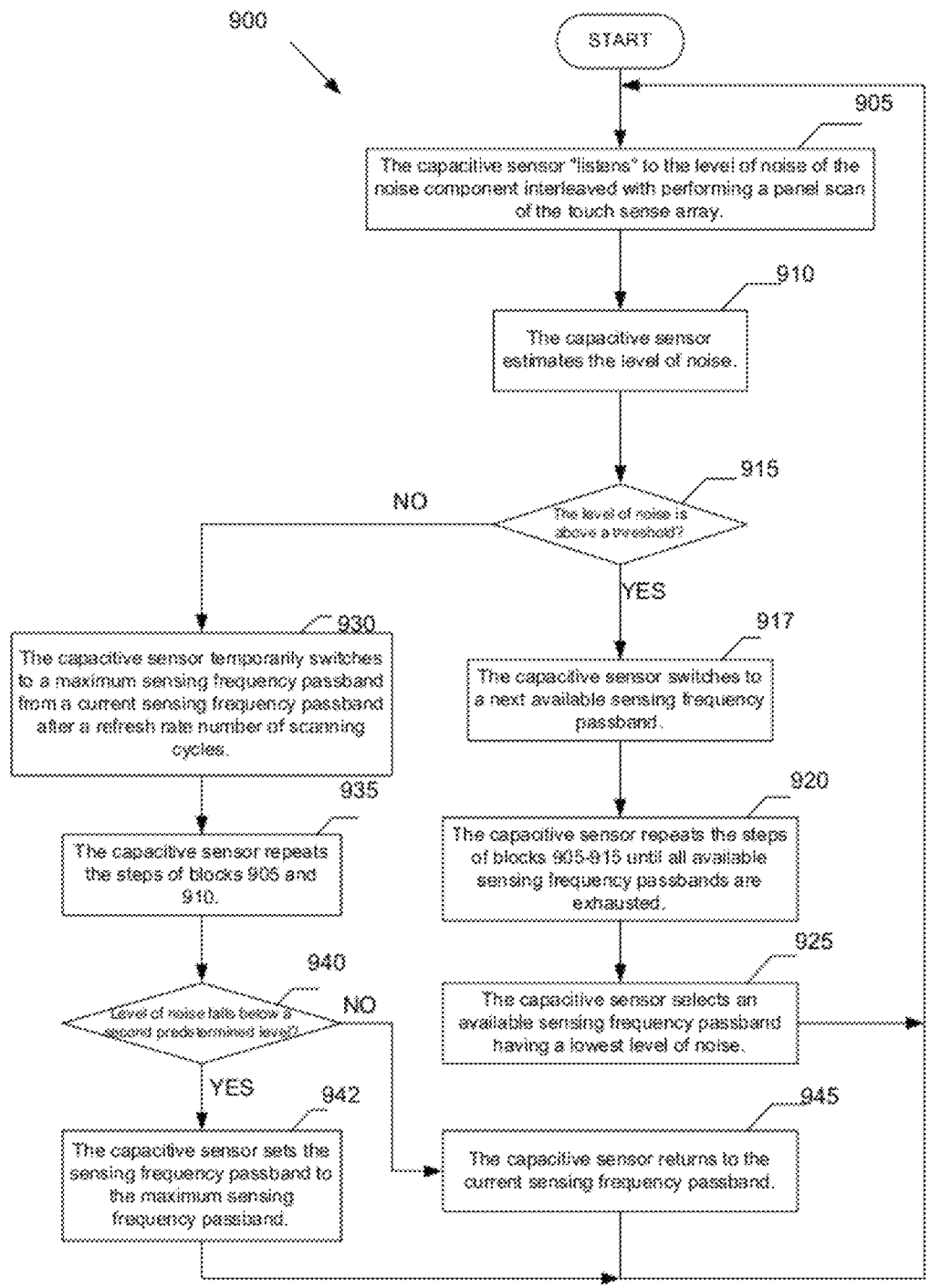
FIG. 9 is process flow diagram illustrating the steps of FIG. 8 of estimating a noise component of the response signal and changing a sensing frequency passband in greater detail.

FIG. 9 is process flow diagram 900 illustrating the steps of FIG. 8 of measuring a noise component of the response signal and changing the sensing frequency passband in greater detail. Referring now to FIGS. 5, 6, 8 and 9, at block 905, the capacitive sensor 501 "listens" (see below) to the level of noise of the noise component interleaved with performing a panel scan of the touch sense array 521. At block 910, the capacitive sensor 501 estimates the level of noise. At block 915, if the level of noise is above a threshold, then at block 917, the capacitive sensor 501 switches to a next available scanning configuration with a different sensing frequency passband (i.e., operating frequency band). At block 920, the capacitive sensor 501 repeats the steps of blocks 905-915 until all available scanning configurations corresponding to different sensing frequency passbands are exhausted. At block 925, the capacitive sensor 501 selects an available sensing frequency passband with a lowest level of noise. If, at block 915, the level of noise is not above the threshold, then at block 930, the capacitive sensor 501 temporarily switches to a maximum sensing frequency passband from a current sensing frequency passband after a refresh rate number of scanning cycles. At block 935, the capacitive sensor 501 repeats the steps of blocks 905 and 910. At block 940, if the level of noise falls below a second predetermined level, then at block 942, the capacitive sensor 501 sets the sensing frequency passband to the maximum sensing frequency passband, otherwise, at block 945, the capacitive sensor 501 returns to the current sensing frequency passband.

Figure 10:
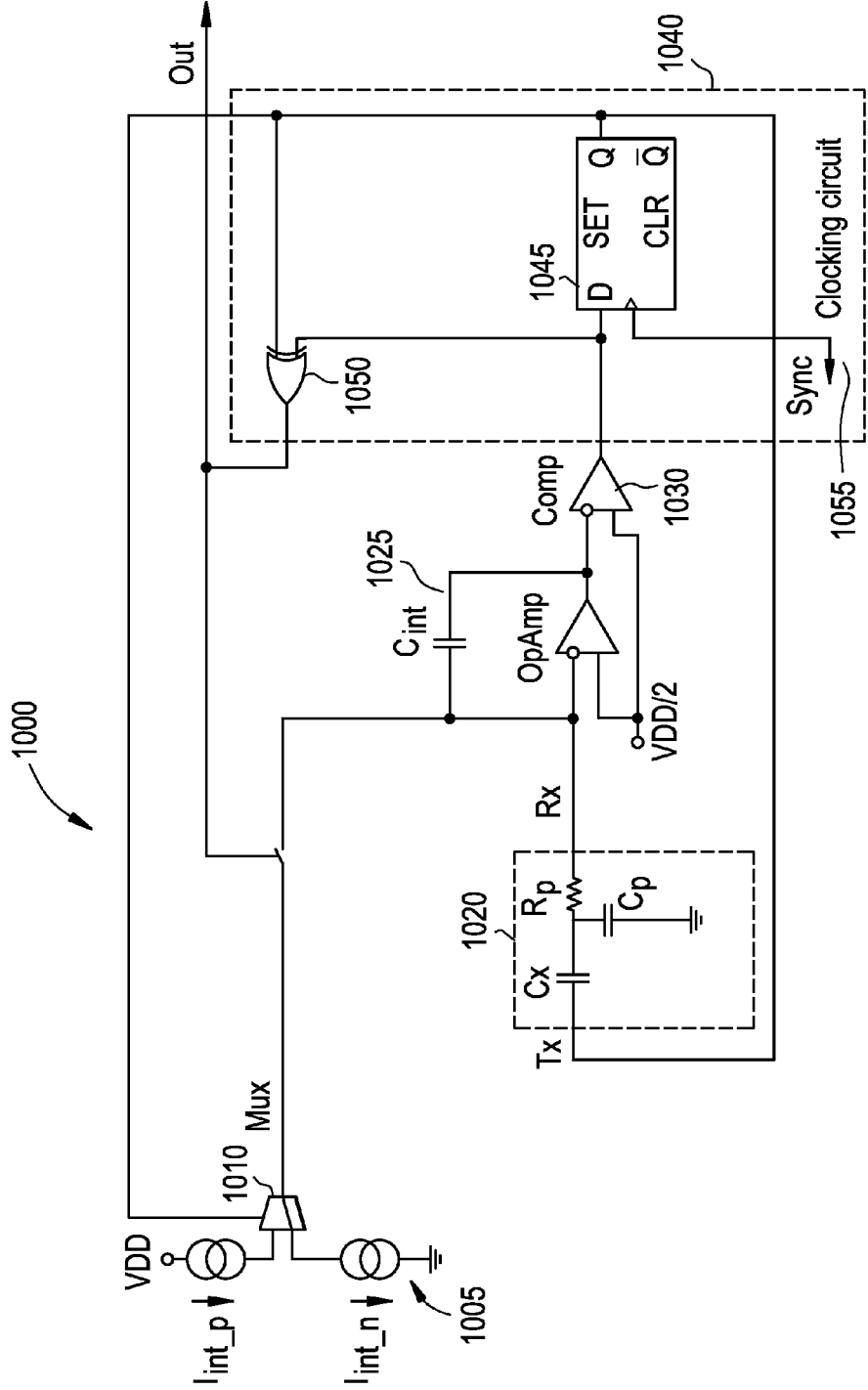
FIG. 10 is an electrical schematic block diagram of one embodiment of a combined demodulation circuit, clock generator, and signal generator of the capacitance sensor corresponding to FIG. 5.

FIG. 10 is an electrical schematic block diagram of one embodiment of a combined demodulation circuit 616, clock generator 614, and signal generator 615 of the capacitance sensor 501 (hereinafter "the sensing channel 1000") corresponding to FIG. 5. The sensing channel 1000 includes a combined programmable current source/sink 1005 coupled to a multiplexer 1010 for that selects between either the current source or sink to provide a desired polarity of applied current to a portion of a touch sense array 1020. A receive RX signal is scanned by a demultiplexer (not shown) that is coupled to an integrator 1025 and a comparator 1030. The comparator 1030 is coupled to a clocking circuit 1040 that includes a flip flop 1045 and an exclusive NOR gate 1050 whose output is a pulse having a width proportional to a baseline capacitance of the portion of the touch sense array 1020 being measured. The resulting clock signal 1055 is used to form an "OUT" signal 1060 determined by the lowest operational or scanning frequency of all measurement channels.

Figure 11:
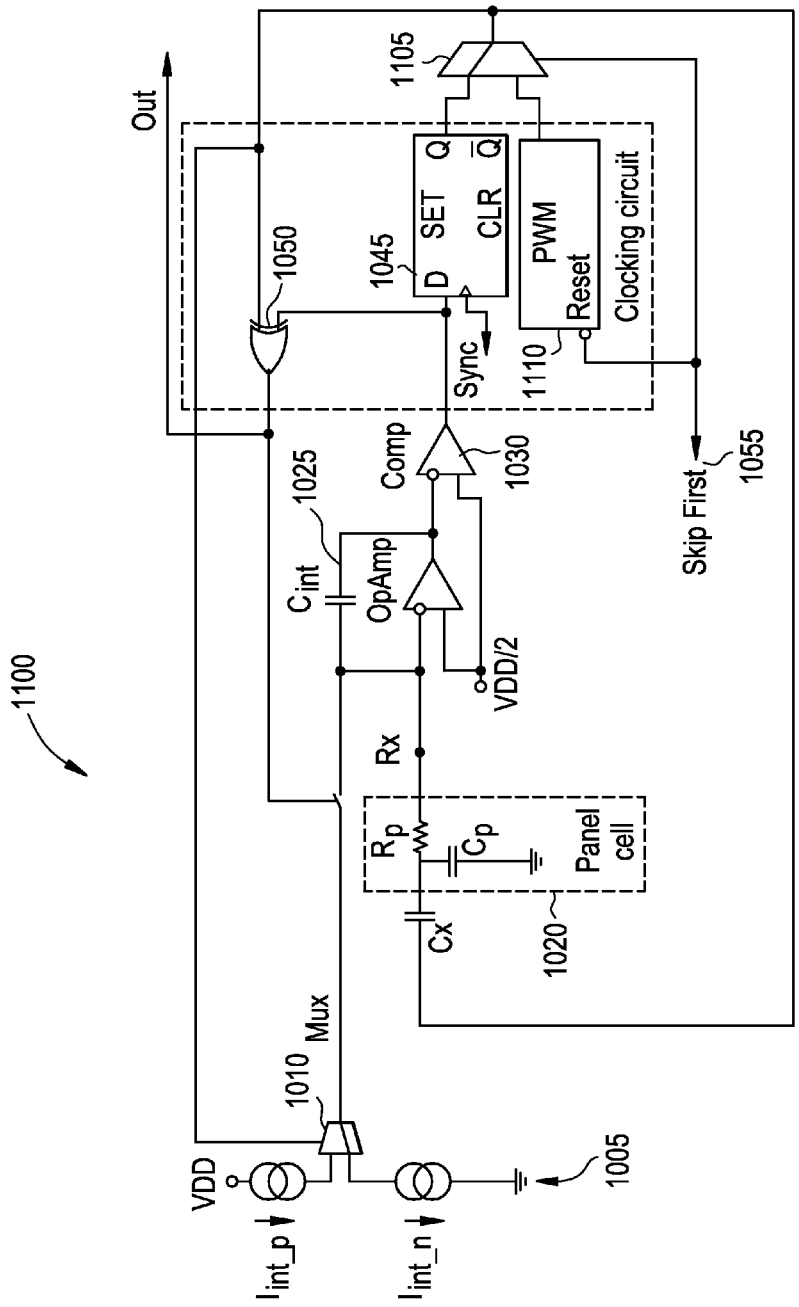
FIG. 11 is a schematic block diagram of the circuit of FIG. 10 modified to include an additional channel that forces synchronization of the sensing frequency passband to cause the frequency spectrum of the noise component to substantially match the passband of the capacitive sensing circuit.

Shifting a channel frequency passband using the circuit of FIG. 10 according to the method described above in FIGS. 8 and 9 require shifting of baseline capacitance, and may suffer from parasitic effects that may degrade touch response. A possible solution to these drawbacks is shown in FIG. 11. FIG. 11 is a schematic block diagram of the circuit of FIG. 10 modified to include an additional channel that forces synchronization of the sensing frequency passband to cause the frequency spectrum of the noise component to substantially match the passband of the capacitive sensing circuit. The circuit 1100 of FIG. 11 now includes an additional multiplexer 1105 and a pulse width modulation (PWM) circuit 1110 coupled to an output of the flip flop 1040. Under "normal" operating conditions, the circuit of FIG. 11 operates as in FIG. 10. When the multiplexer is switched to an additional channel, the circuit 1110 causes the frequency spectrum of the noise component to substantially match the passband of the capacitive sensing circuit. For correct operation, the frequency passband of the forced synchronization channel may be lower than a minimal operational panel frequency employed with the current source/sink 1005.

Figure 12:
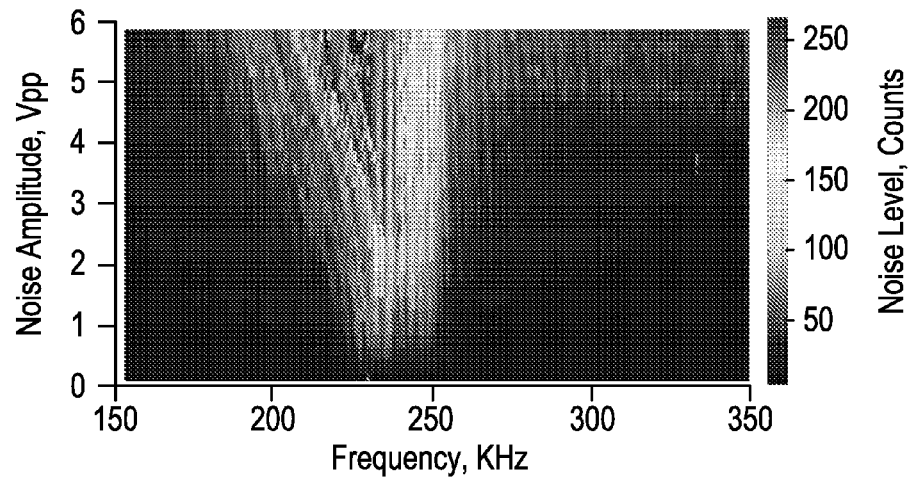
FIG. 12 shows a plot of frequency versus noise amplitude for noise coupled into the circuit of FIG. 10.
Figure 13:
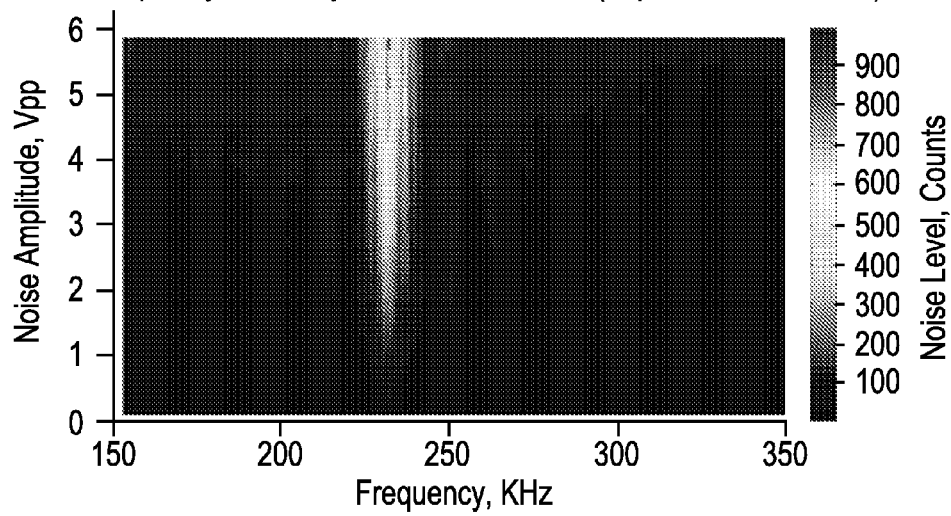
FIG. 13 shows a plot of frequency versus noise amplitude for noise coupled into the circuit of FIG. 11.
Figure 14A:
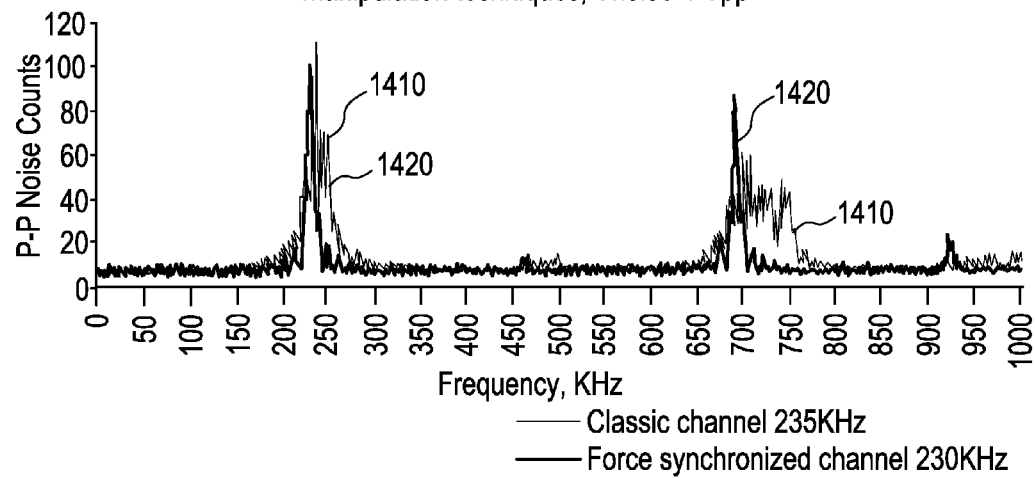
FIGS. 14A-14C show plots of peak-to-peak noise response versus frequency of the response channels for the circuits of FIGS. 10 and 11, respectively.
Figure 14B:
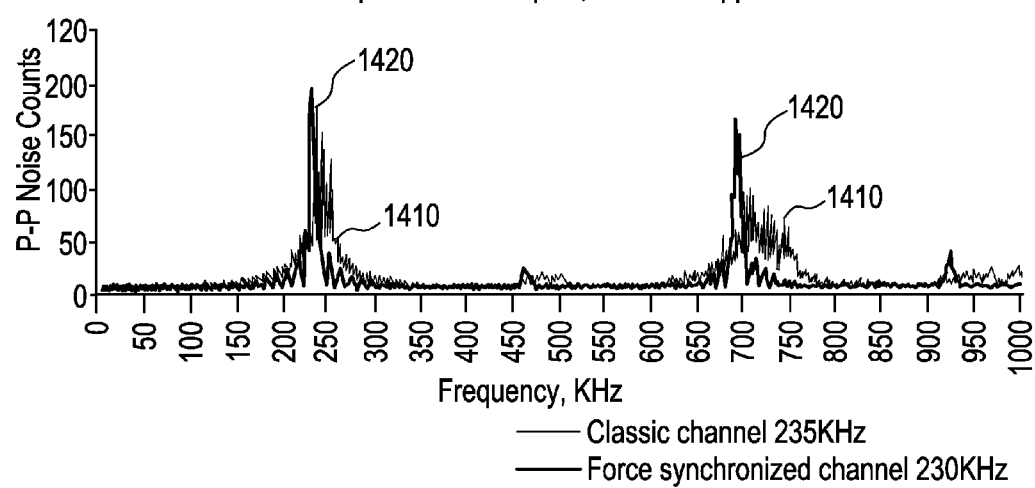
Figure 14C:
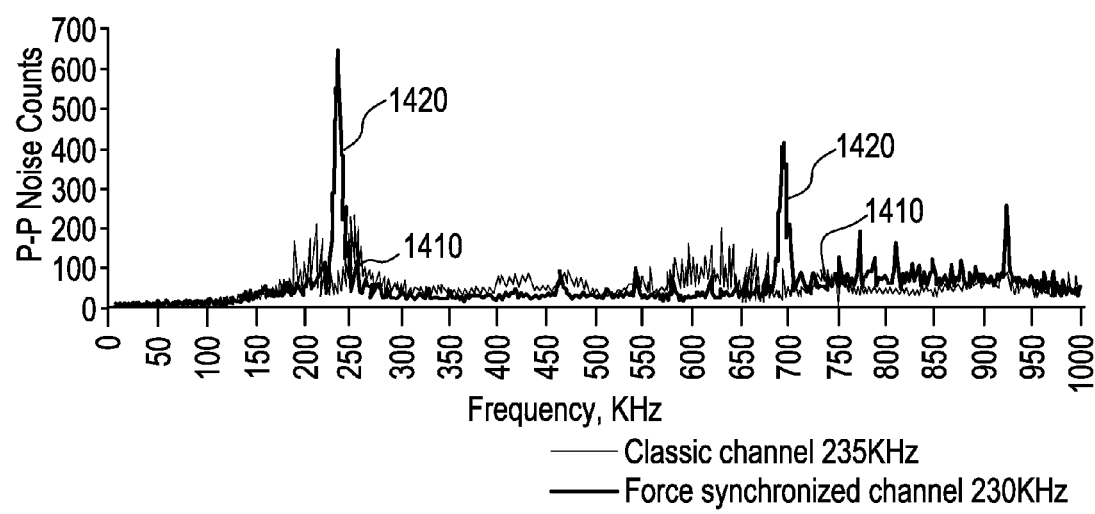

FIG. 12 shows a plot of frequency versus noise amplitude for noise coupled into the circuit of FIG. 10. FIG. 13 shows a plot of frequency versus noise amplitude for noise coupled into the circuit of FIG. 11. It should be noted that in FIG. 12, noise is spread over a relatively large band of frequency and is heavily dependent on amplitude, while in FIG. 13, noise with forced synchronization has a narrow range centered on about the operation frequency (about 230 KHz in this example) and is relatively independent of noise amplitude. This is more readily demonstrated in the plots of FIGS. 14A-14C showing peak-to-peak noise response versus frequency 1410, 1420 of the response channels for the circuits 1000, 1100 of FIGS. 10 and 11, respectively. It should be noted that the noise level around the operational frequency is lower in the case of a channel with forced synchronization. This is because a channel employing forced synchronization is in an operation mode of a measurement channel when the output frequency passband of the measurement channel is determined by the PWM circuit 1110 of FIG. 11. Any change in measured capacitance has an influence only on a duty cycle of the operating frequency passband (i.e., of circuit 1100).

Figure 15A:
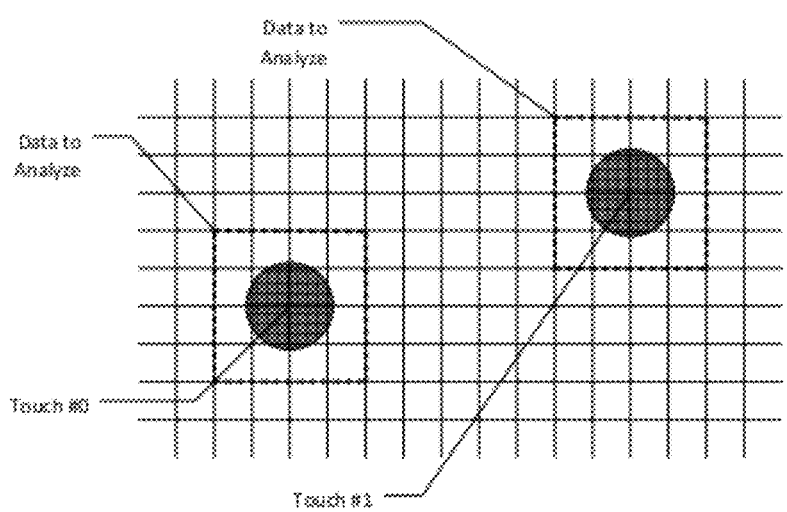
FIG. 15A depicts a touch sense area around which raw counts levels may be analyzed during several conversions of a conductive object proximate to the touch sense array.
Figure 15B:
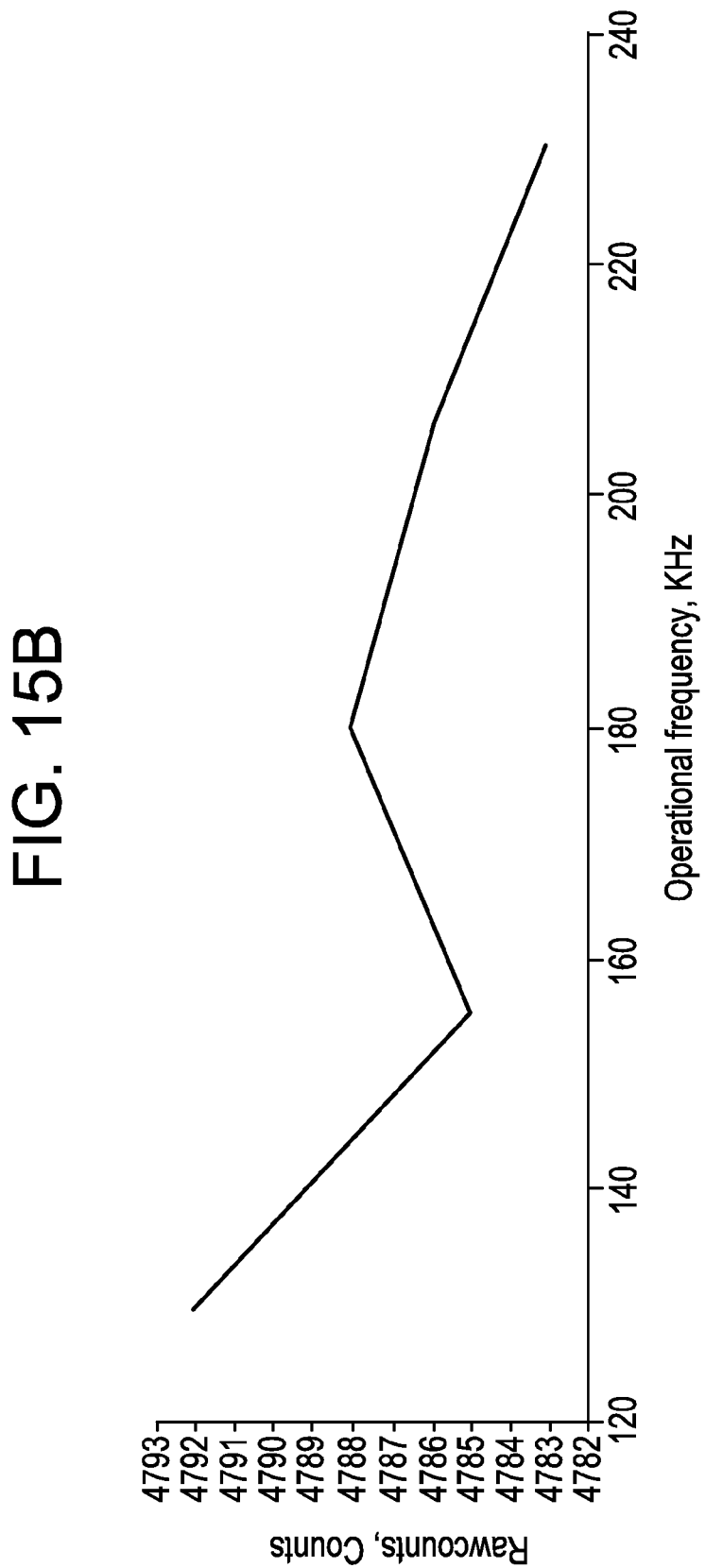
FIG. 15B shows the dependence between a baseline and forced synchronized channel operational frequency.

One or more methods may be employed to measure a level of noise once forced synchronization is applied to determine whether the level of noise is above a threshold. In one embodiment, a raw counts series (i.e., a measured series of data) may be analyzed during several panel scan sessions and a conclusion may be drawn about the noise level. Raw counts are digital values that are a direct result of a capacitance measurement (from a capacitive sensor) as output from an analog-to-digital converter. In a related embodiment, the raw counts levels may be analyzed during several conversions around a touch area of a conductive object proximate to the touch sense array as shown in FIG. 15A. In such circumstances, response data (digital values) may be analyzed around touch positions to save processing resources. FIG. 15B shows the dependence between a baseline and forced synchronized channel operational frequency. FIG. 15B is relative to the circuit 1100 of FIG. 11 and shows an absence of parasitic effect of baseline shifting due to changes in sensing frequency passband.

In another embodiment, another method is based on analyzing touch position jitter history of a touch position of a conductive object proximate to the touch sense array.

In another embodiment, a measurement of noise level is obtained while applying a TX signal for a predetermined number of cycles (e.g., 2-3) and analyzing a distribution of the noise level during a second set of one or more measurement cycles (e.g., 20-30), where the first set of cycles is less than the second set of cycles, and where during the second set of cycles full conversion measurements are performed.

Figure 16:
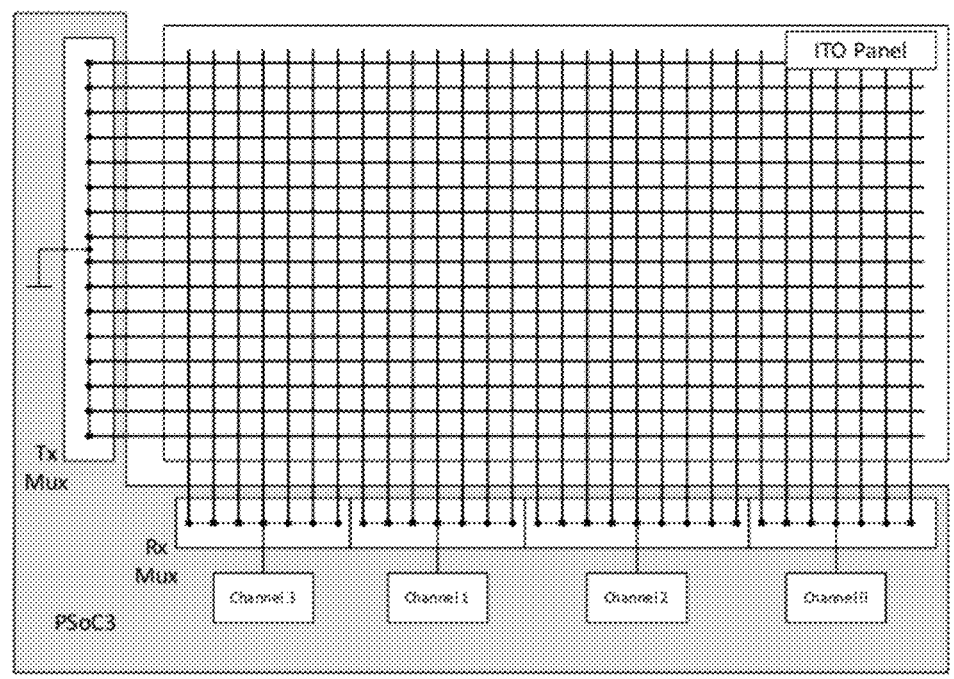
FIG. 16 is schematic block diagram of a capacitive sense array configured for "listening" to a level of noise by measuring the level of noise in a mutual capacitance mode when all receive (RX) electrodes are tied together in a single channel and a transmit (TX) signal absent on TX electrodes.

In still another embodiment, the capacitive sensor 501 "listens" to, i.e., measures the presence of noise on an RX channel when transmit TX signals are absent. FIG. 16 is schematic block diagram of a capacitive sense array configured for "listening" to a level of noise by measuring the level of noise in a mutual capacitance mode when all receive (RX) electrodes are tied together in a single channel and a transmit (TX) signal absent on TX electrodes. Listening is insensitive to touches and water and permits measuring only the noise level. A conclusion about the presence and level of noise may be drawn before touch position reporting. As a result, the system 500 can reject noisy measurements of capacitance and preemptively warn the host 550 about the unacceptable level of noise.

Figure 17:
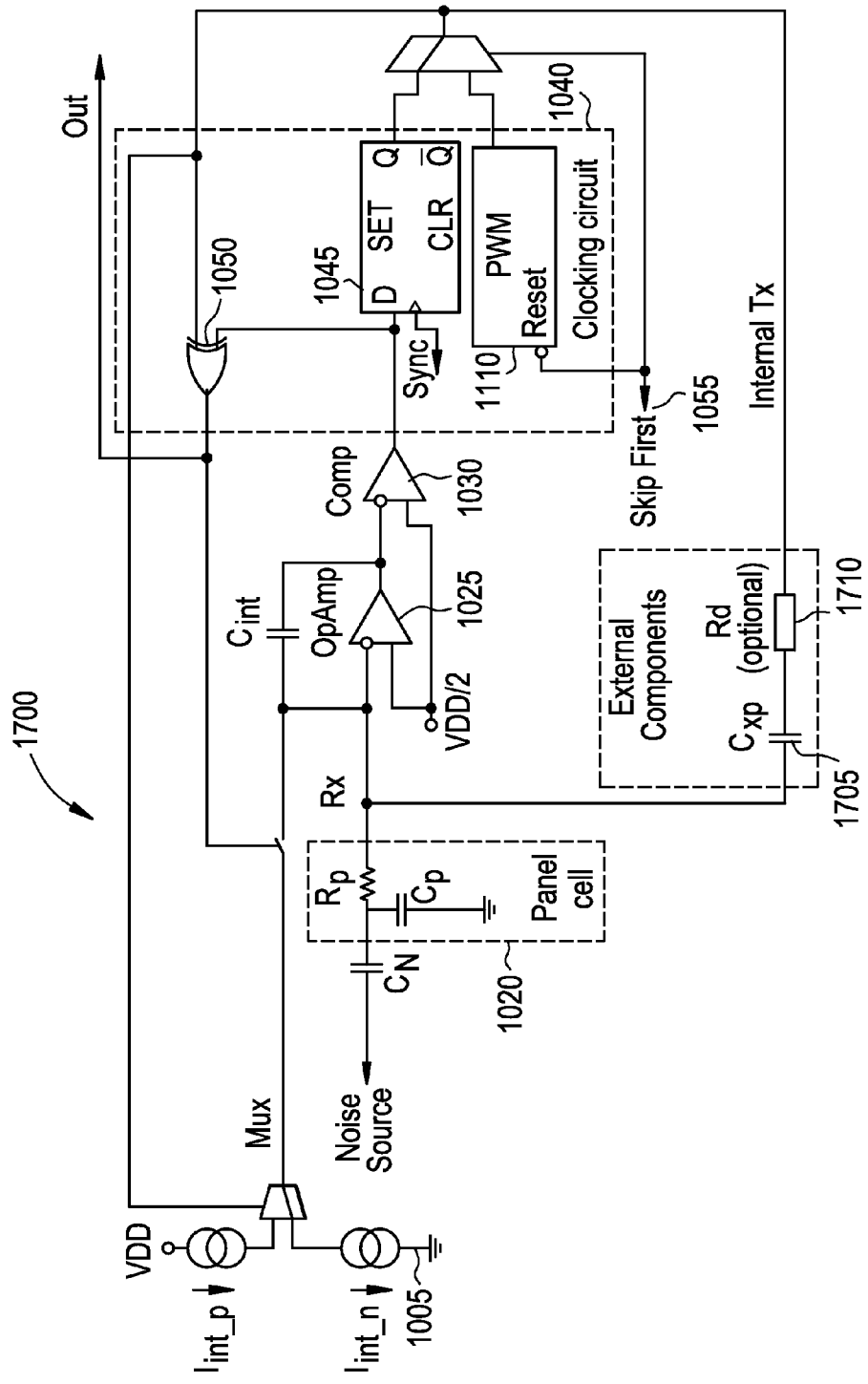
FIG. 17 is an electrical schematic diagram of a noise listener circuit created by modifying the forced synchronization measurement channel circuit of FIG. 11 to include external components.

FIG. 17 is an electrical schematic diagram of a noise listener circuit 1700 created by modifying the forced synchronization measurement channel circuit of FIG. 11 to include external components. The circuit 1700 includes an additional external capacitor 1705 and optional resistor 1710 coupled between the output of the multiplexer 1010 for applying an internal TX driving signal to the integrator 1025. The circuit 1700 provides a stable pass band for measuring noise.

Figure 18:
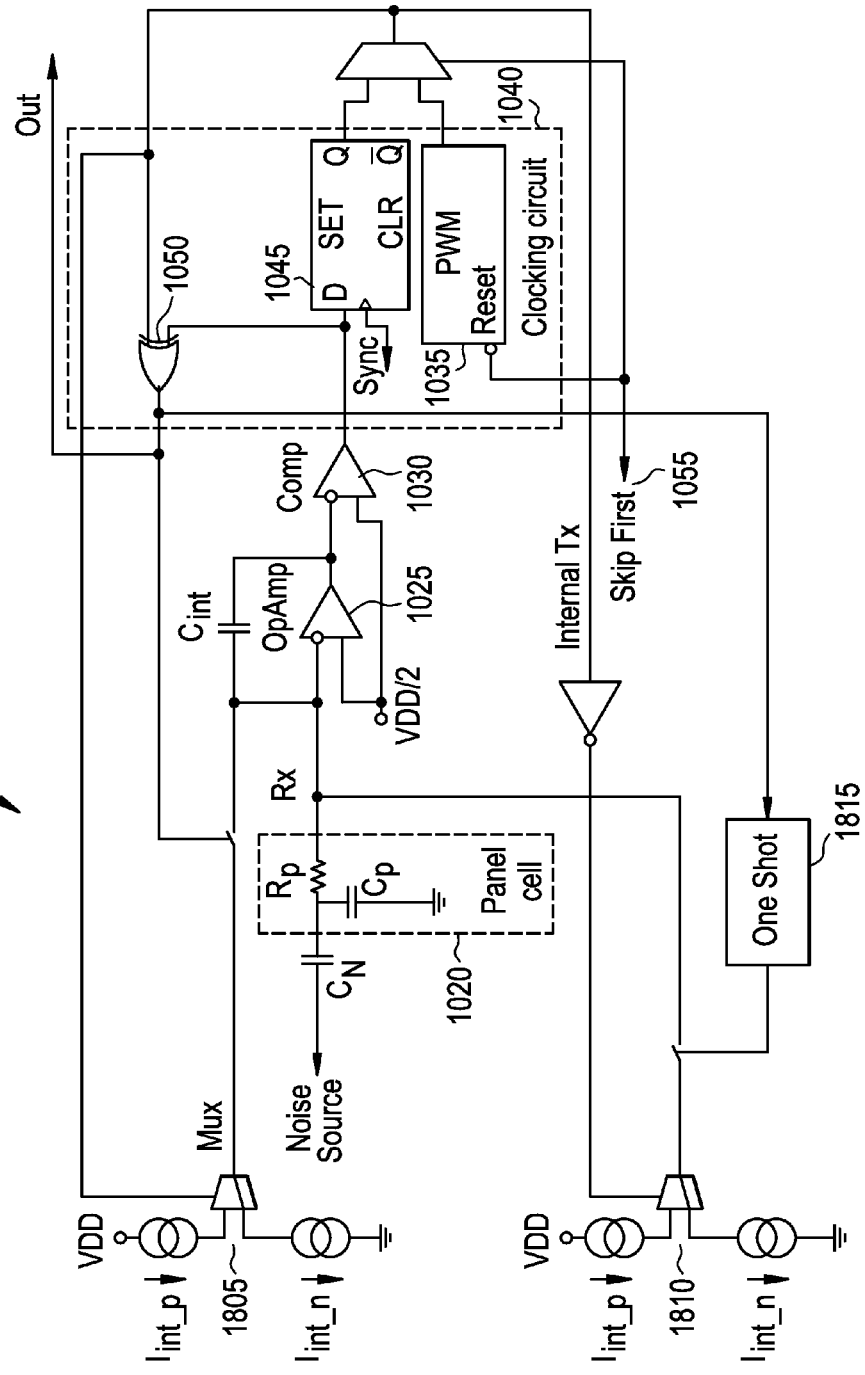
FIGS. 18 and 19 show electrical circuit diagrams of embodiments of noise listeners without external circuit elements added to the circuit of FIG. 11.
Figure 19:
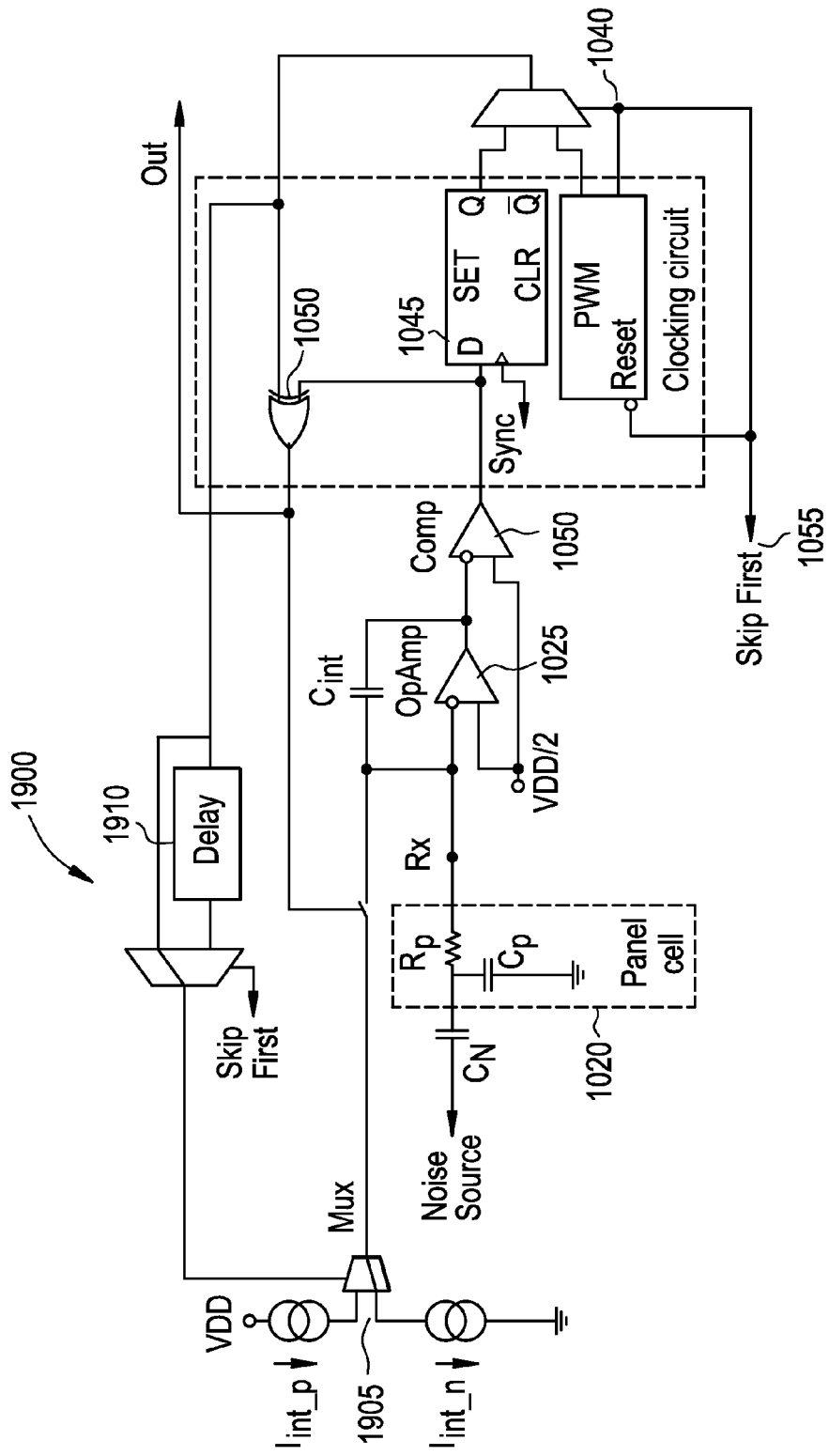

FIGS. 18 and 19 show electrical circuit diagrams of embodiments of noise listeners 1800, 1900 without external circuit elements added to the circuit of FIG. 11. The noise listener 1800 employs a pair of current sources 1805, 1810 each coupled to the clocking circuit 1040 and a one shot 1815 coupled between the clocking circuit 1040 and one of the current sources 1805, 1810. The current source 1810 and the one shot 1815 are used to remove external components 1705 and 1710 of FIG. 17. The noise listener 1900 employs a single current source 1905 coupled to the clocking circuit 1040 and a delay circuit 1910 coupled between the clocking circuit 1040 and the current source 1905. The delay circuit 1910 is used to remove the current source 1810 and one shot 1815 because current sources 1805 and 1810 have opposite current direction. When the current source 1810 is active, the direction of current needs to be opposite that of when current source 1810 is inactive.

Figure 20A:
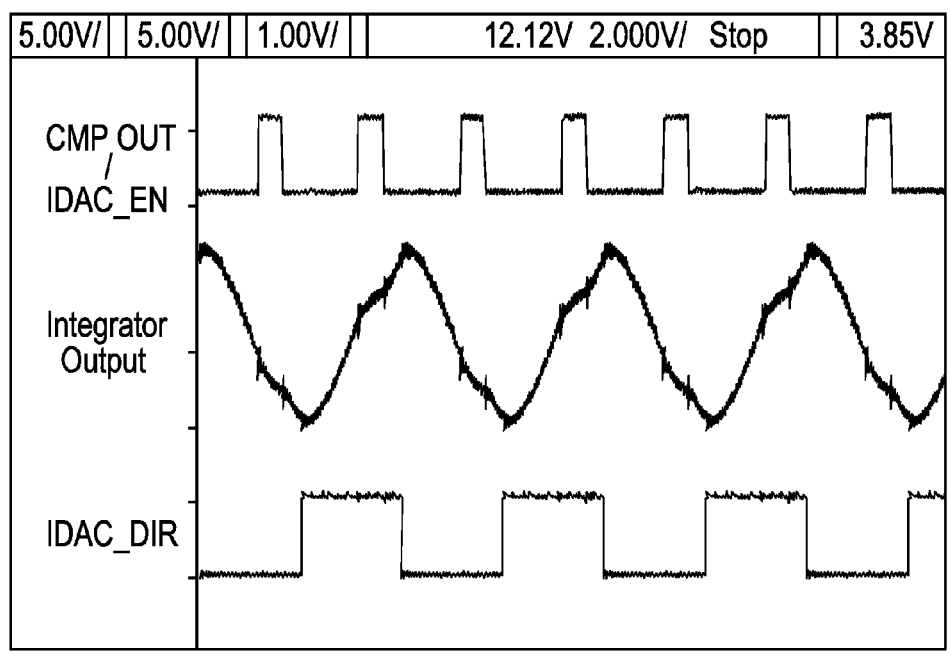
FIG. 20A shows operational waveforms for the noise listener of FIG. 19.
Figure 20B:
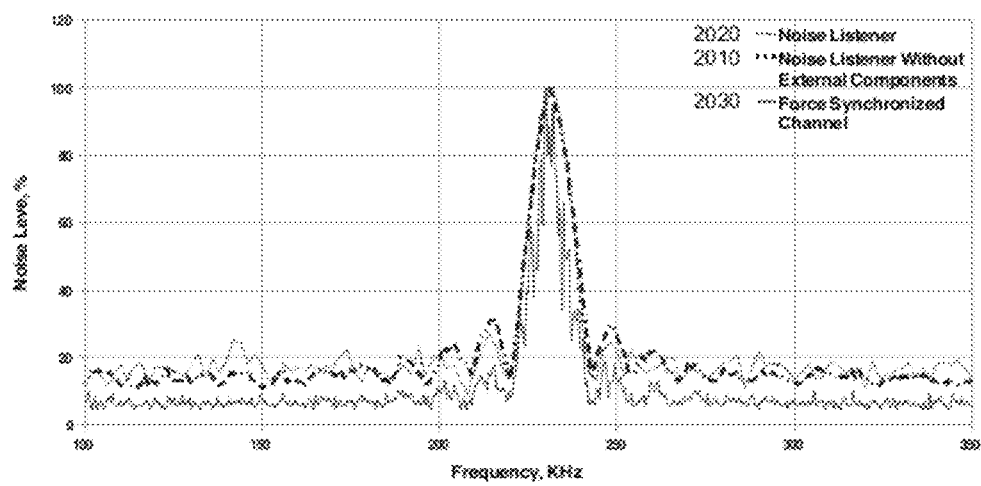
FIG. 20B shows a comparison of frequency responses for the noise listeners of FIGS. 11 and 19 and for the forced synchronization channel without noise listening of FIG. 10, respectively.
Figure 21:
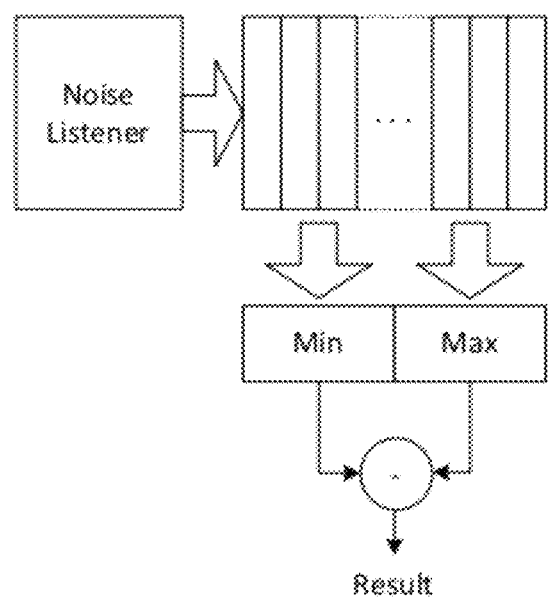
FIG. 21 shows a block diagram of a peak detector for measuring noise as noise counts.
Figure 22:
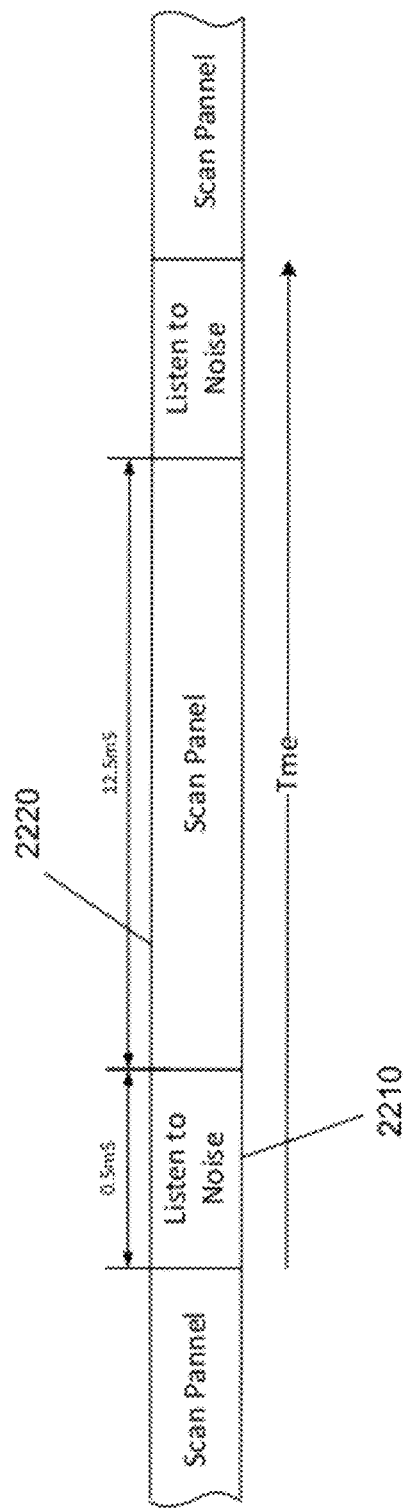
FIG. 22 shows time intervals in which listening to the level of noise may be alternated with a full panel scan of a touch sense array.
Figure 23:
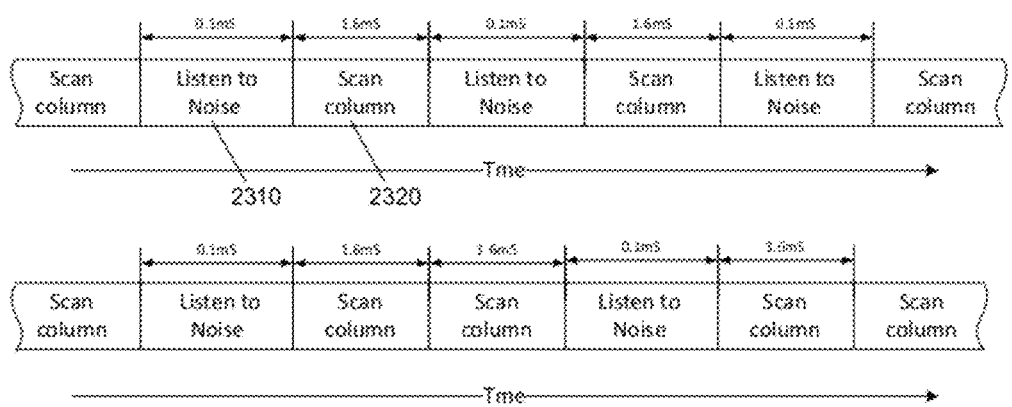
FIG. 23 shows time intervals in which listening to the level of noise may be interleaved with performing a partial scan of a touch sense array.

FIG. 20A shows operational waveforms for the noise listener 1900. FIG. 20B shows a comparison of frequency responses 2010, 2020, 2030 for the noise listeners of FIGS. 11 and 19 and for the forced synchronization channel without noise listening of FIG. 10, respectively. Processing of data received from a noise listener may be performed by processing logic 522 in the processing device 510. In one embodiment, noise may be measured as noise counts (i.e., a number bits of data emanating from the ADC 617) using a peak-to-peak detector as shown in the block diagram of FIG. 21. The data may be captured in a number of ways. FIG. 22 shows time intervals 2210, 2220 in which listening to the level of noise is alternated with a full panel scan of a touch sense array. FIG. 23 shows time intervals 2310, 2320 in which listening to the level of noise is interleaved with performing a partial scan of a touch sense array.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:
   interleaving between listening for a level of noise and performing a scan of a touch sense array, the listening for the level of noise comprising:
   receiving a response signal, which is generated in an absence of the scan, at a capacitive sensing circuit from the touch sense array;
   measuring a noise component of the response signal;
   determining whether the level of noise is above a threshold; and
   when a level of noise within a passband of the capacitive sensing circuit is greater than a threshold, changing at least one parameter of the capacitive sensing circuit to move the passband substantially outside the frequency spectrum of the noise component.

2. The method of claim 1, wherein said changing at least one parameter comprises at least one of changing a sensing frequency passband, integration time, driving signal, a number of sub-conversions per conversion cycle, and a number of TX cycles applied in an individual sub-conversion.

3. The method of claim 2, wherein said changing the sensing frequency passband comprises forcing synchronization of the sensing frequency passband to cause the frequency spectrum of the noise component to substantially match the passband of the capacitive sensing circuit.

4. The method of claim 1, wherein said determining whether the level of noise is above the threshold comprises analyzing raw counts levels during several conversions around a touch area of a conductive object proximate to the touch sense array.

5. The method of claim 1, wherein said determining whether the level of noise is above the threshold comprises analyzing touch position jitter history of a touch position of a conductive object proximate to the touch sense array.

6. The method of claim 1, wherein said determining whether the level of noise is above the threshold comprises obtaining a measurement of the level of noise while applying a TX signal for a predetermined number of cycles and analyzing a distribution of the noise level during a second set of one or more cycles, wherein the predetermined number of cycles is less than the second set of one or more cycles, and wherein during the second set of one or more cycles full conversion measurements are performed.

7. The method of claim 1, wherein said determining whether the level of noise is above the threshold comprises listening to the level of noise by measuring the level of noise in a mutual capacitance mode when all receive (RX) electrodes are tied together in a single channel and a transmit (TX) signal absent on TX electrodes.

8. The method of claim 7, comprising alternating between listening to the level of noise and performing a full panel scan of the touch sense array.

9. The method of claim 7, comprising interleaving between listening to the level of noise and performing a partial panel can of the touch sense array.

10. The method of claim 2, wherein said measuring a noise component of the response signal and said changing a sensing frequency passband comprises:
    (a) listening to the level of noise interleaved with performing a panel scan of the touch sense array;
    (b) measuring the level of noise;
    (c) if the level of noise is above a threshold, switching to a next available sensing frequency passband;
    (d) repeating (a)-(c) until all available sensing frequency passbands are exhausted; and
    (e) selecting an available sensing frequency passband having a lowest level of noise.

11. The method of claim 10, further comprising:
    (f) temporarily switching to a maximum sensing frequency passband from a current sensing frequency passband after a refresh rate number of scanning cycles;
    (g) repeating (a) and (b); and
    (h) if the level of noise falls below a second predetermined level, setting the sensing frequency passband to the maximum sensing frequency passband, otherwise
    (i) returning to the current sensing frequency passband.

12. A circuit comprising
a capacitive sensing circuit configured to:
    receive a response signal from a touch sense array, which is generated in an absence of a scan of the touch sense array;
    measure a noise component of the response signal; and
    when a level of noise of the noise component within a passband of the capacitive sensing circuit is greater than a threshold, change at least one parameter of capacitive sensing circuit to move the passband substantially outside the frequency spectrum of the noise component.,
wherein the capacitive sensing circuit comprises a circuit for forcing synchronization of a sensing frequency passband to cause the frequency spectrum of the noise component to substantially match the passband of the capacitive sensing circuit.

13. The circuit of claim 12, wherein the circuit for forcing synchronization of the sensing frequency passband comprises a clocking circuit.

14. The circuit of claim 13, wherein the capacitive sensing circuit further comprises a pair of current sources each coupled to the clocking circuit and a one shot coupled between the clocking circuit and one of the current sources to determine whether the level of noise is above the threshold.

15. The circuit of claim 13, wherein the capacitive sensing circuit further comprises a current source coupled to the clocking circuit and a delay circuit coupled between the clocking circuit and the current source to determine whether the level of noise is above the threshold.

16. A processing device, comprising:
a capacitive sensing circuit configured to:
    receive a first response signal from a touch sense array; and
    measure a noise component of the first response signal, when a level of noise of the noise component within the passband of the capacitive sensing circuit is greater than a threshold, change at least one parameter of capacitive sensing circuit to move the passband substantially outside the frequency spectrum of the noise component; and
    processing logic coupled to the capacitive sensing circuit and configured to detect a conductive object proximate to the touch sense array using a second response signal generated responsive to a scan of the touch sense array, wherein the processing logic is configured to interleave between listening to the level of noise and performing the scan.

17. The apparatus of claim 16, wherein the processing device further comprises a circuit for forcing synchronization of a sensing frequency passband to cause the frequency spectrum of the noise component to substantially match the passband of the capacitive sensing circuit.

* * * * *